US011911797B1

(12) United States Patent
Dwivedi et al.

(10) Patent No.: US 11,911,797 B1
(45) Date of Patent: Feb. 27, 2024

(54) SYSTEMS AND METHODS FOR MULTI-PATH PACKAGE SORTATION

(71) Applicant: Amazon Technologies, Inc., Seattle, WA (US)

(72) Inventors: Rajeev Dwivedi, Sammamish, WA (US); Kaushal Bharatkumar Mehta, Seattle, WA (US); Ameya Abhyankar, Franklin, TN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/954,743

(22) Filed: Sep. 28, 2022

(51) Int. Cl.
*B07C 3/08* (2006.01)
*B07C 3/14* (2006.01)
*B07C 3/18* (2006.01)

(52) U.S. Cl.
CPC .................. *B07C 3/08* (2013.01); *B07C 3/14* (2013.01); *B07C 3/18* (2013.01); *B07C 2301/0066* (2013.01)

(58) Field of Classification Search
CPC .... B07C 3/08; B07C 3/14; B07C 3/18; B07C 2301/0066; B65G 47/53; B65G 47/68; B65G 47/682
USPC .......................................................... 209/584
See application file for complete search history.

(56) References Cited

U.S. PATENT DOCUMENTS

| | | | | |
|---|---|---|---|---|
| 8,796,577 B2 * | 8/2014 | Harres | B65H 29/60 209/583 |
| 10,471,477 B2 * | 11/2019 | Benyoub | B07C 3/14 |
| 2009/0242356 A1 * | 10/2009 | Layne | B07C 3/08 198/348 |
| 2021/0354297 A1 * | 11/2021 | Deng | B25J 19/023 |

* cited by examiner

*Primary Examiner* — Michael McCullough
*Assistant Examiner* — Jessica L Burkman
(74) *Attorney, Agent, or Firm* — Eversheds Sutherland (US) LLP

(57) ABSTRACT

Systems, methods, and computer-readable media are disclosed for multi-path sorting systems that facilitate package sorting for delivery and near-real time changes to sortation for rerouting of the packages. The package sorting system may include conventional conveyor systems that deliver packages to multi-path conveyors (e.g., multi-path conveyor belts) that may cause the package to be moved in multiple directions to ultimately deposit a package onto an output conveyor system for delivery to a downstream location (e.g., packaging station, sorting station, etc.). The input conveyors may include a sensor for determining information about the package (e.g., destination address, order information, etc.) which may be used to determine the optimal downstream route for the package, which may be adjusted as conditions change.

20 Claims, 10 Drawing Sheets

SYSTEMS AND METHODS FOR MULTI-PATH PACKAGE SORTATION

BACKGROUND

With the popularity of e-commerce and delivery services, the volume of packages ordered and delivered continues to increase. The high volume of packages requires delivery fulfillment centers and/or sorting centers capable of receiving, sorting, and distributing a very large volume of packages. For example, a fulfillment and/or sorting center may fulfill millions of orders a year. As a result, fulfillment and/or sorting centers will receive and package millions of items for delivery. To ensure each package is efficiently routed to an appropriate delivery address (e.g., destination address), each package must be sorted (e.g., based on the destination address). Sortation of the packages may be dependent on operational conditions in the fulfillment centers and sorting centers as well as outside factors such as environmental conditions and delivery vehicle conditions, which may quickly change. It may be desirable to adjust sortation parameters and routes in response to changes to conditions that may affect delivery of the package. Accordingly, there is a need for multi-path package sortation that is adjustable in (e.g., in near real time).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
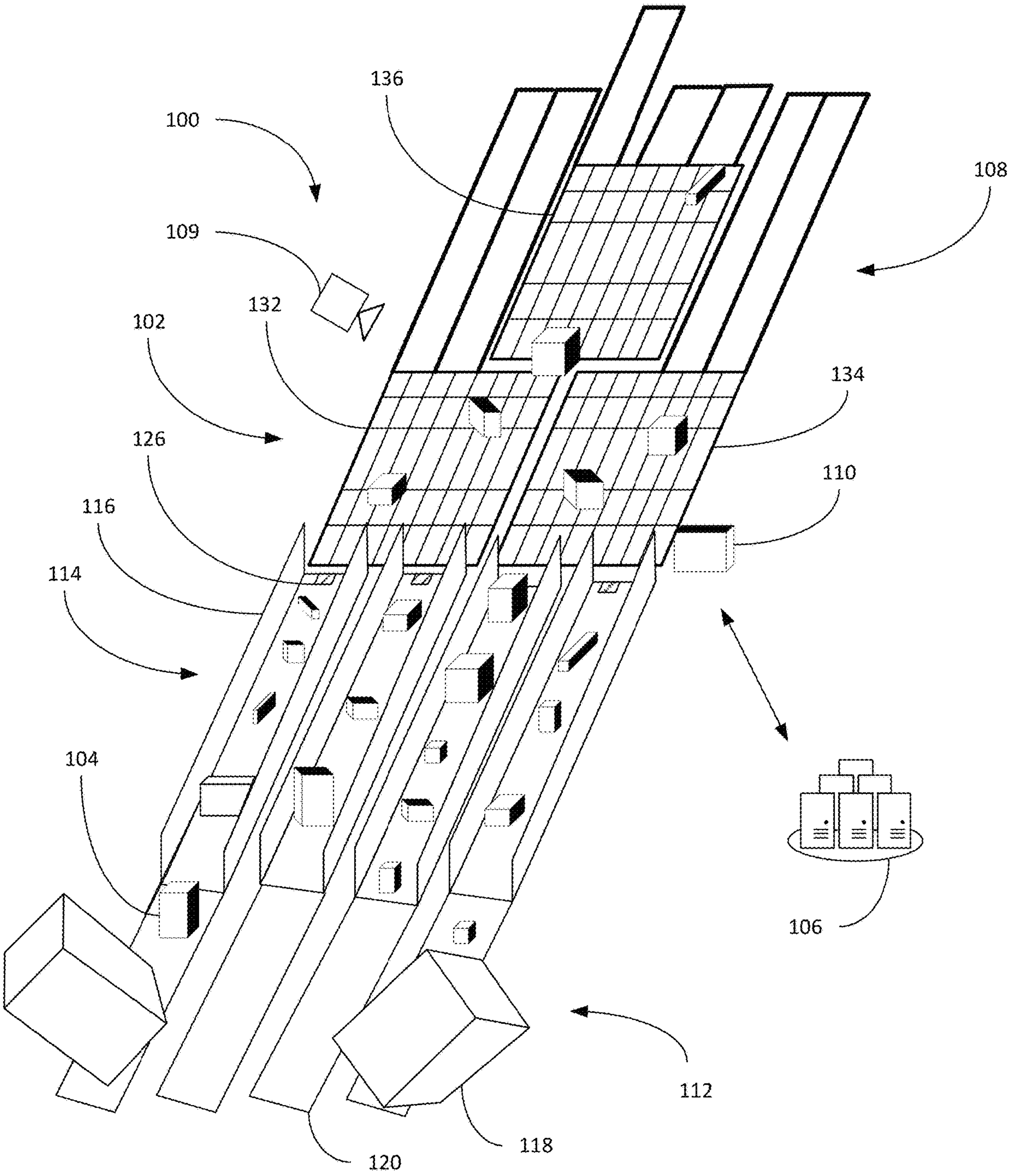
FIG. 1 is a schematic illustration of an example use case of multi-path conveyor systems for multi-path sortation, in accordance with one or more exemplary embodiments of the disclosure.

Multi-path package sortation systems and methods are provided herein. The multi-path package sorting systems may be fulfillment centers, sorting centers, or the like and may be designed to receive and sort, for delivery a large volume of packages (e.g., thousands, millions, billions, of packages per year) and adjust and update sortation (e.g., for load balancing or efficiency purposes). For example, the package sorting system may be a fulfillment center having several hundred thousand, a million, or more square feet and may deliver millions of packages per year and the multi-path package sortation systems may facilitate efficient and accurate package sortation in these facilities. The term fulfillment center used herein is understood to include any fulfillment, sorting, and/or transportation center.

The multi-path sortation system may include one or more multi-path conveyors that may receive packages from multiple conveyors and may selectively deposit the packages onto certain other conveyors. In one example, the multi-path conveyors may be multi-path conveyor belts designed to move a package both forwards and to the right and left. For example, the multi-path conveyor may be a conveyor with a matrix of distinct conveyor belts that may be independently moved to rotate and move a package to in a certain direction or orientation. Multiple multi-path conveyors may be arranged in series or in a pyramid structure. For example, two multi-path conveyors may deposit packages into one multi-path conveyor.

Each multi-path conveyor may receive packages or other items from several conveyors. For example, each multi-path conveyor may receive packages from conveyors originating at an induction station. In one example, each multi-path conveyor may receive packages from multiple conveyor belts. Prior to being deposited onto the multi-path conveyors, labels or other indicia on the package or item may be scanned or otherwise digitally captured and/or analyzed to determine package information corresponding to the package or item. Package information may include a destination address, order information, and/or item information, for example.

The multi-path sortation system may use some or all of the package information for determining an optimal or desirable route to a packaging station or other downstream station for preparing the package for outbound shipment. Each fulfillment center and sorting center may include several such stations and multiple conveyors (e.g., conveyor belts, rollers, chutes) and other structures and devices for transporting a package from induction to a packaging station, and the multi-path sortation system may select the most efficient and/or optimal route for transporting the package from the multipath conveyor to the destination.

As conditions in the fulfillment or sortation center change (e.g., backup, malfunction, breakdown of a conveyor or packaging station, etc.,), or as exterior conditions change (e.g., delivery vehicle or route is altered or weather changes delivery route to designation), it may be desirable to update the path between induction and the packaging station. The multi-path sortation system may route the package to different packaging stations and/or may cause a package to be transported to a packaging station via a different conveyor. It is understood that the multi-path sortation system may balance the load of packages at the fulfillment or sortation center in this way.

Referring to FIG. 1, an example use case of multi-path sorting system 100 is depicted in accordance with one or more exemplary embodiments of the disclosure. Package sorting system 100 may be within or part of a package fulfillment center having several items and/or packages and may be designed to sort, and/or distribute packages and/or items to stations for packing, outbound shipping, and/or further sorting. As shown in FIG. 1, multi-path sorting system 100 may include multi-path sortation conveyors 102 that may be controlled by one or more computing device 110 and/or remote servers 106. Computing device 110 may be any computing device with a processor designed to control one or more multi-path conveyor 102. In one example, computing device 110 may be a controller or may be in communication with and/or coordinate with a controller.

Computing device 110 and/or remote server 106 may facilitate communication to and/or between components of multi-path sortation system 100 (e.g., conveyors, drive units, robotic systems, etc.), may process information, signals, and sensors, and/or perform operations and tasks described herein. It is understood that computing device 110 and/or remote server 106 may be one or more computing devices and remote server 106 may be located on site or off-site. For example, computing device 110 and/or remote server may be one or more severs, computers, desktop computers, controllers, laptop computers, datastores, and/or any other electronic or computing device. Additionally, the computing device 110 and/or remote server 106 may communicate with one or more server (e.g., remote server 106) via any well-known wired or wireless system. Server 106 may be one or more server and may include one or more computing device with a processor.

It is understood that one or more components of multi-path sortation system 100 may include computing devices (not shown) that may be in contact with computing device 110 and/or server 106. In the illustrated example, the computing device 110 and/or server 106 may communicate with one or more conveyor system, lift system, robotic system, drive unit and/or any other systems and/or components of multi-path sorting system 100. Computing device 110 and/or server 106 may communicate with other computing devices via any well-known wired or wireless system (e.g., Bluetooth, Bluetooth Low Energy (BLE), near field communication protocol, Wi-Fi, cellular network, etc.).

Multi-path sorting system 100 may receive packages and/or items (i.e., non-packaged products) at receiving area 112, which may be an induction station. For example, multi-path sorting system 100 may include package 104, which may alternatively be an item. While packages are referenced throughout, it is understood that items may be sorted and distributed in the same manner. Multi-path sorting system 100 may include input conveyors 114. Input conveyors 114 may be conveyor belts, rollers, chutes, drive units, and/or any other system for transporting packages from one location to another. For example, input conveyors 116 may be any well-known conveyor belt system. Input conveyors 114 may include several input conveyors that may optionally be designed for singulation such that only one package at a time is conveyed along a given area of each input conveyor 114.

Input conveyors 114 may provide packages from induction station 112. Induction station 112 may be any station designed to receive packages or items (e.g., from delivery vehicles). In one example, inductions station 112 may include induction conveyors 120 which may be any well known conveyor system (e.g., conveyor belt) that may be designed to receive items and/or packages. For example, loads of packages may be introduced to induction conveyors (e.g., via gaylords 118 or any other method for depositing packages). Induction conveyors may deposit packages onto input conveyors 114 for transportation to multi-conveyor systems 102. Input conveyors 114 may be any type of well known conveyor system. It is understood that input conveyors 114 and induction conveyors 120 may be the same conveyor system or may be multiple conveyor systems.

Input conveyors 116 may include one or more sensors 126 for detecting information about each package. For example, sensor 126 may be a scanning device for scanning bar codes, QR codes, text, images, and/or any other well-known scanning or detecting devices. Sensor 126 may determine information about each package (e.g., package information). Package information may include an order identifier, a package identifier, a destination address, name of an individual, user identifier, and/or any other information relating to the package, item, product, user, purchaser, delivery, destination, purchased and/order. In one example, sensor 126 may be a bar code scanner, for example. Sensor 126 may be positioned near multi-path conveyors 102.

Package information determined by sensors 126 may be communicated or otherwise shared with or determined by computing device 110 and/or remote server 106. Computing device 110 and/or remote server 106 may process the information generated by scanners 126.

Alternatively, a different computing device may be in communication with sensors 126 and may process this information and/or share this information with computing device 110 and/or remote server 106. Computing device 110 and/or remote server 106 may analyze the package information and determine an output conveyor (e.g., output conveyor 108) necessary or desirable for reaching a packaging station for output shipment.

Multi-path conveyors 102 may include one or more multi-path conveyors. Multi-path conveyors may be designed to convey an item and/or package in a forward, and optionally backward, direction as well as a left and right direction. For example, multiple-path conveyor 132 may be a multi-path conveyor belt having multiple discrete and independently movable conveyor belts. For example, multi-path conveyor 132, may have a matrix of conveyor belts that may have the same width and/or length or may vary in width and/or length. By selectively controlling each conveyor belt independently (e.g., via computing device 110), a package and/or item may be rotated and/or caused to be perpendicular to the direction of motion of each individual conveyor belt. It is understood that all individual conveyor belts may move in the same direction yet may collectively achieve perpendicular movement of a package or item. Alternatively, any other well-known conveyor system offering movement in multiple axis or planes that may be perpendicular may be used.

As shown in FIG. 1, multiple multi-path conveyor belts may be used in multi-path sorting system 100. For example, multi-path conveyor 132, multi-path conveyor 134, and multi-path conveyor 136 may each be included in multi-path sorting system 100. Multi-path conveyor 134 and/or multi-path conveyor 136 may be the same or similar to multipath conveyor 132. Multi-path conveyor 136 may be positioned behind and offset from multi-path conveyor 132 and multi-path conveyor 134, in a pyramid arrangement. It is understood that greater or fewer multi-path conveyors mays be used and/or that a different arrangement of multipath conveyors may be used (e.g., in series).

In the pyramid arrangement shown in FIG. 1, multi-path conveyor 132 and multi-path conveyor 134 may be used to perform preliminary sortation and distribution. It is understood that multi-path conveyor 132, multi-path conveyor 134, and/multi-path conveyor 136 may be controlled by a single computing device (e.g., 110) or multiple computing devices in communication with one another. In the arrangement illustrated in FIG. 1, the preliminary sortation performed by multi-path conveyor 132 and/or multi-path conveyor 134 may deposit one or more packages on select output conveyors based on the package information from sensor 126. Alternatively, multi-path conveyor 132 and/or multi-path conveyor 134 may deposit packages onto multi-path conveyor 136 for further sortation.

Multi-path conveyor 136 may receive packages from multi-path conveyor 132 and multi-path conveyor 134 and selectively deposit packages on one of several output conveyors. The conveyor may be selected based on the package information determined using sensor 126. For example, computing device 110 and/or remote server 106 may analyze the package information determined using sensor 126 and may use the package information to determine a packaging station for outbound shipping as well as a conveyor associated with the packaging station.

Upon determining the packaging information, computing device 110 and/or remote server 106 may determine how to route the package along the multi-path conveyor so that the package may ultimately be deposited on the desired conveyor associated with the packaging station. It is understood that the desired container may be accessed using only one multi-path conveyor (e.g., multi-path conveyor 132 or multi-path conveyor 134) or may be accessed using multiple multi-path conveyors (e.g., multi-path conveyor 132 or multi-path conveyor 134 together with multi-path conveyor 136).

Multi-path sorting system 100 may further include optical sensor 109, which may be a camera or any other optical sensor and may be oriented such that the multi-path conveyors are in the field of view of optical sensor 109. Optical sensor 109 may generate information about the movement of packages across the multi-path conveyors and may send or otherwise share this information with computing device 110 and/or remote server 106, which may analyze and/or process the information to determine whether the packages are on track to reach their desired destination (e.g., desired output conveyor or multi-path conveyor). If computing device 110 and/or remote server 106 determines that the package is not on-track, computing device 110 and/or remote server 106 may cause the multi-path conveyors to re-route or course correct such that the package is deposited on the desired output conveyor or multi-path conveyor.

Illustrative Process and Use Cases

Figure 2:
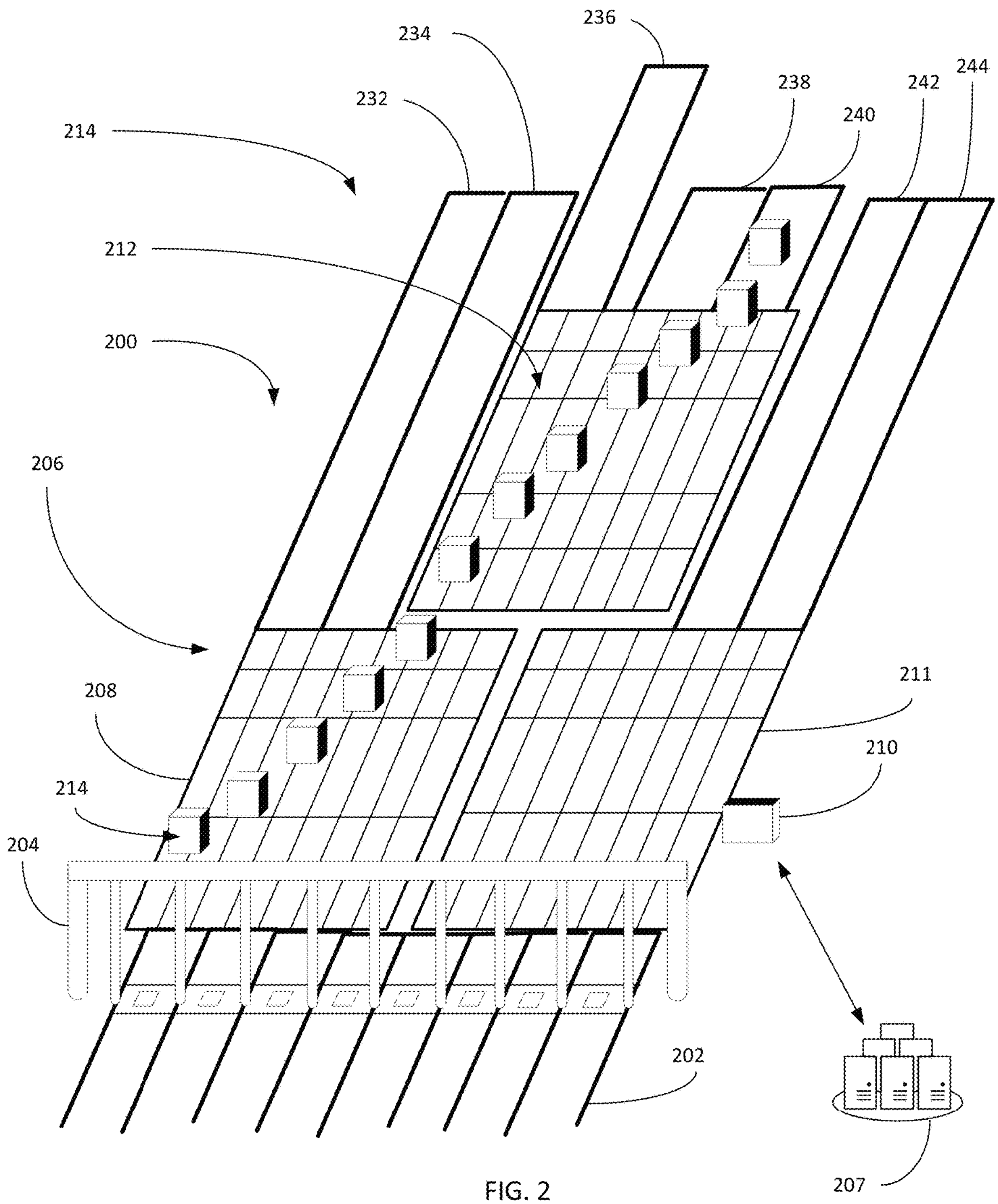
FIG. 2 is a schematic illustration of an example use case of multi-path conveyor systems for multi-path sortation having six-sided scanners, in accordance with one or more exemplary embodiments of the disclosure.

Referring now to FIG. 2, a multi-path sorting system with a multi-sided sensor is illustrated. Specifically, multi-path sorting system 200 is illustrated and may include input conveyors 202, sensing devices 204, multi-path conveyors 206, and output conveyors 214. Input conveyors 202 may be the same as or similar to input conveyors 114. For example, input conveyors may be any type of well-known conveying system (e.g., conveyor belt, rollers, chute, etc.). It is understood that multiple input conveyors 202 may be received by each multi-path conveyor 206.

Each input conveyor may include multi-sided sensors 204. For example, multi-sided sensors may be scanning devices designed to scan barcodes, QR codes, text, and/or images and the like. In one example, sensors 204 may be any type of well-known optical sensor and/or any other sensor designed for scanning barcodes, QR codes, text, and/or images (e.g., a camera). Multi-sided sensors 204 may include a support structure as well as sensors.

Figure 3:
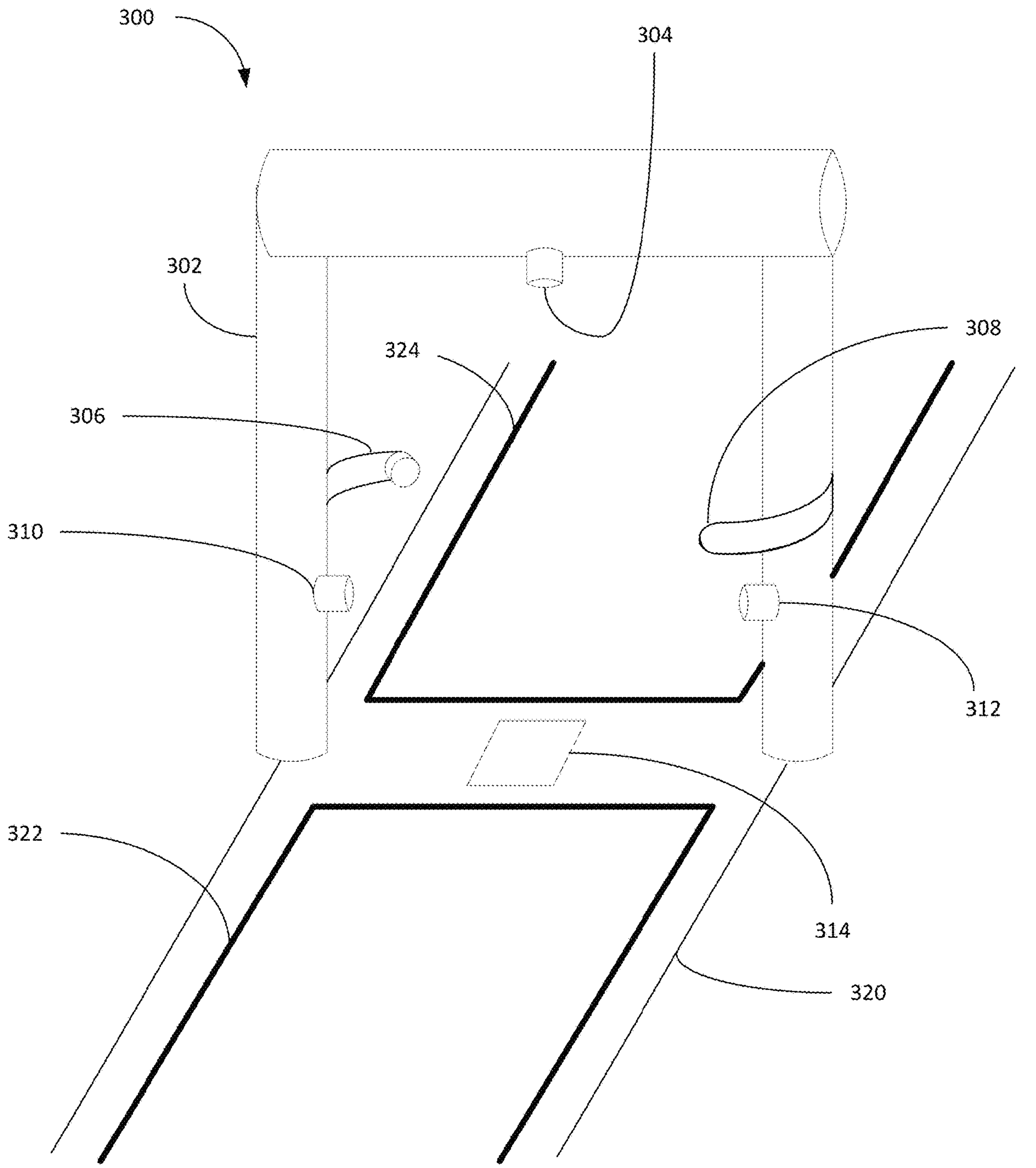
FIG. 3 is a schematic illustration of an example six-sided scanner, in accordance with one or more exemplary embodiments of the disclosure.

In one example, multi-sided sensors 204 of FIG. 2 may include multi-sided sensor 300, illustrated in FIG. 3. Referring now to FIG. 3, multi-sided sensor 300 may include support structure 302, which may include two vertical posts and one horizontal post. Alternatively, any other support structure and/or shape may be used (e.g., a circular structure). Multi-sided sensor 300 may be a six-sided sensor. For example, multi-sided sensor 300 may include downward facing sensor 304 having a downward field of view, backward facing sensor 306 having a backward field of view, forward facing sensor 308 having a forward field of view, right facing sensor 310 having a right-hand field of view, left facing sensor 312 having a left-hand field of view, and upward facing sensor 314 having an upward field of view.

Backward facing sensor 306 and forward facing sensor 308 may each be supported by protruding structures orientating each sensor in their respective directions. Upward facing sensor 314 may be built into input conveyor 320. For example, upward facing sensor 314 may be fitted below a window on the surface of upward facing sensor 314 such that packages traversing input conveyor 320 may move over the window and thus field of view of upward facing sensor 314.

Input conveyor 320 may the same as or similar to a conveyor of input conveyor 202 of FIG. 2. Input conveyor 320 may be a conveyor belt system, for example, and may include two conveyors or a split conveyor system such that first conveyor portion 322 may terminate near multi-sided sensor 314 and second conveyor portion 324 may begin immediately after multi-sided sensor 314. In one example, first conveyor portion 322 and second conveyor portion 324 may be the same surface but may be routed below multi-sided sensor. Alternatively, multi-sided sensor 300 may be positioned near the end of input conveyor such that only one conveyor portion is needed.

Multi-sided sensor 300 may include a computing device (e.g., controller) having a processor and/or may be in communication with a computing device and/or remote server of the multi-path sorting system (e.g., computing device 210 and/or remote server 207 of FIG. 2). In one example, the signal and/or data generated by multi-sided sensor 300 may be shared with the computing device and/or remote server of the multi-path sorting system. Information such as the sensor and/or input conveyor associated with the signal and/or data relating to timing information may also be shared for geospatial and timing purposes.

Referring again to FIG. 2, after the package or item is deposited from one of input conveyors 202, the package or item may be received by multi-path conveyors 206. Multipath conveyors 206 may be the same as or similar to multi-path conveyors 102 and may similarly be arranged in a pyramid pattern. After receiving the signal and/or data generated by multi-sided sensor 204, computing device and/or remote server 207 may determine a desired output conveyor 214 and a route across multi-path conveyors 206 to reach the desired output conveyor 214.

To determine a route across multi-path conveyors 206, computing device 210 and/or remote server 207 may determine a packaging station or other station, packaging location, or packaging point within the fulfillment or sorting center corresponding to the signal and/or packaging information generated by multi-sided sensor 204. For example, computing device 210 and/or remote server 207 may determine a packaging station or other downstream location within the facility associated with the shipping address or other packaging information corresponding.

The optimal output conveyor 214 for transporting the package to the desired downstream location may then be determined. As shown in FIG. 2, output conveyor 232 and output conveyor 234 may each receive packages from multi-path conveyor 208 and may go to different packaging or other stations downstream. Output conveyor 236, output conveyor 238, and output conveyor 240 may each receive packages from multi-path conveyor 212 and may similarly go to a different stations or locations downstream. Also, output conveyors 242 and 244 may each receive packages from multi-path conveyor 211.

In one example, output conveyors 232 and 234 may be routed to the same station or location as output conveyors 242 and 244. For example, output conveyor 242 may be routed to the same packaging location or station as output conveyor 232 and output conveyor 244 may be routed to the same packaging station or location as output conveyor 234. It is understood, however, that any number of input conveyors 202 and/or output conveyors 214 may be used.

Figure 4:
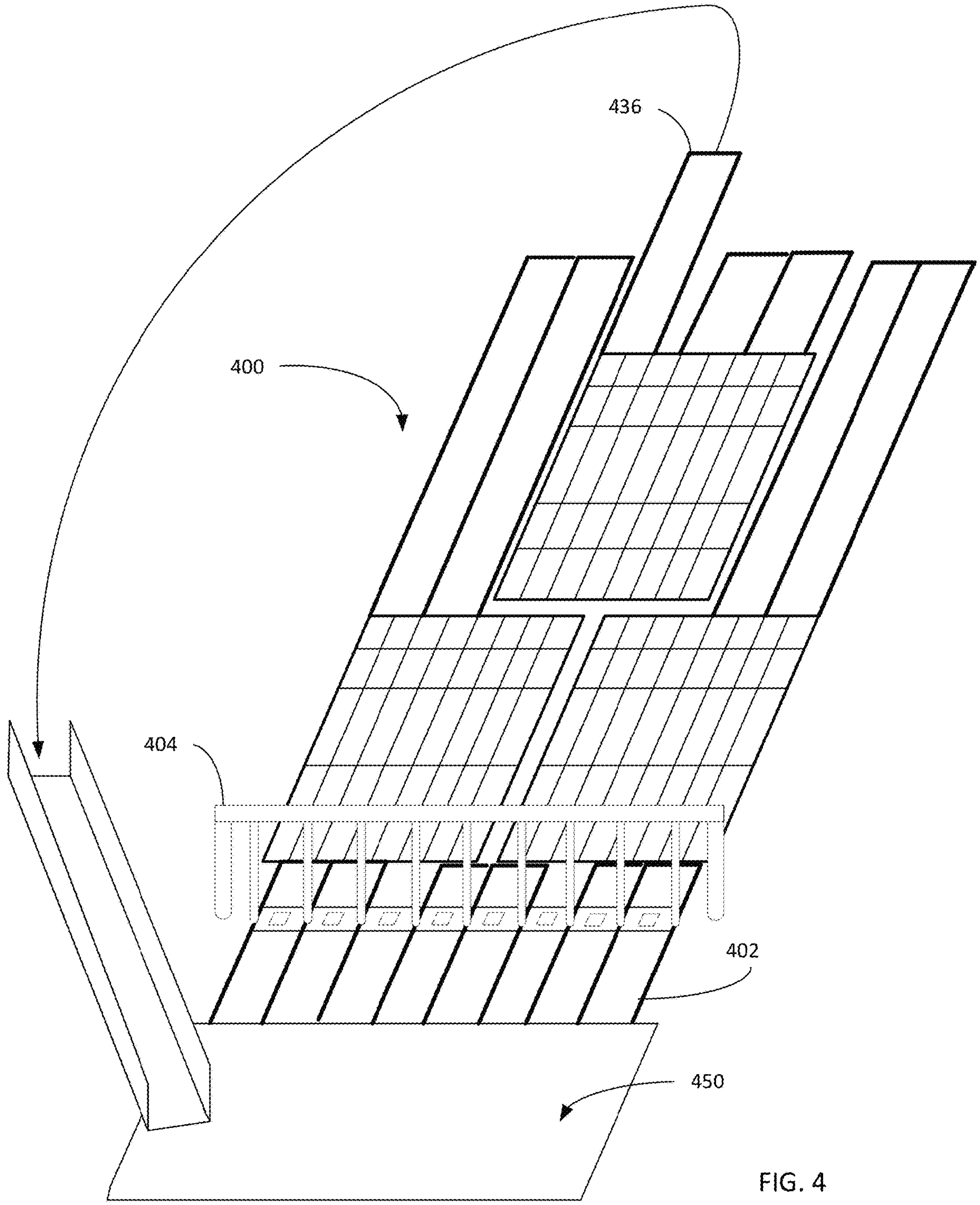
FIG. 4 is a schematic illustration of an example use case of multi-path conveyor systems for multi-path sortation having a recirculation conveyor, in accordance with one or more exemplary embodiments of the disclosure.

One output conveyor of output conveyors 212 may be rerouted back to an induction area and/or input conveyors 202 as shown in FIG. 4. Referring now to FIG. 4, output conveyor 436, which may be the same or similar to one of output conveyors 214 of FIG. 2, may not go to a downstream packaging or sorting station, but instead may be rerouted to an upstream location of multi-path sorting system 400, which may be the same or similar to multi-path sorting station of FIG. 2. For example, output conveyor 436 may reroute packages to induction station 450 and/or one or more of input conveyors 402, which may be the same as input conveyors 202 of FIG. 2.

Rerouting a package to induction station 450 may be desirable if multi-sided scanner 404 fails to obtain the package information for a particular package or if such packaging information is not available. Alternatively, rerouting a package to induction station 450 may be desirable if packages become entangled on the multi-path conveyor such that singulation may not be achieved. It is understood that output conveyor 436 may be any output conveyor and/or may be multiple output conveyors. It is further understood that output conveyor 436 may alternatively be used with a one-side multi-path sorting system (e.g., multi-path sorting system 500 of FIG. 5)

Referring again to FIG. 2, the output conveyor may determined by computing device 210 and/or remote server 207 and computing device 210 and/or remote server 207 may determine the appropriate route across one or more multi-path conveyors for depositing the package at the desired output conveyor. The route across the multi-path conveyor may be informed by the location of the input conveyor. For example, computing device 210 and/or remote server 207 may cause certain individual conveyor belts of the multi-path conveyor to move to cause a package to move in a forward, backward, left and/or right motion. In one example, it may be determined that package 214 should be deposited on output conveyor 240 and multi-path conveyors 208 and 212 may be caused to move package to output conveyor 240.

Figure 5:
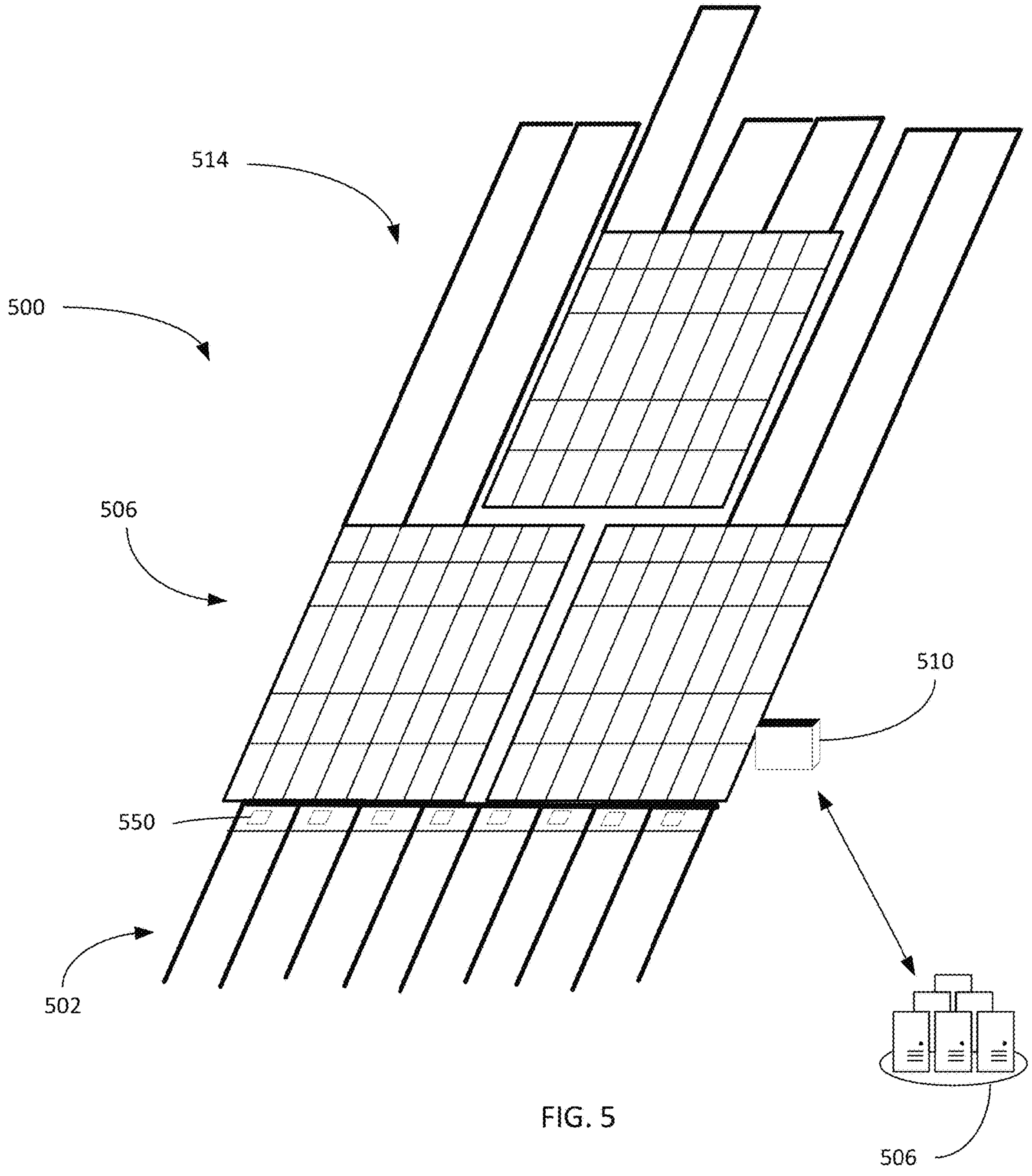
FIG. 5 is a schematic illustration of an example use case of multi-path conveyor systems for multi-path sortation having one-sided scanners, in accordance with one or more exemplary embodiments of the disclosure.

Referring now to FIG. 5, multi-path sorting system 500 is illustrated. As shown in FIG. multi-path sorting system 500 may include input conveyors 502, which may be the same or similar to input conveyors 202 of FIG. 2, multi-path conveyors 506, which may be the same or similar to multi-path conveyors 206 of FIG. 2, and output conveyors 514, which may be the same or similar to output conveyors 214 of FIG. 2. Also similar to FIG. 2, multi-path sorting system 500 may include computing device 410 and remote server 407, which may be the same or similar to computing device 210 and remote server 207 of FIG. 2 and may control multi-path conveyors 506.

As shown in FIG. 5, input conveyors 502 may further include sensors 550. Sensors 550 may be a single-sided sensor such that each sensor may only have one field of view. For example, sensors 550 may be upward facing scanning sensors such that a package with a label having package information may be downward facing on an input conveyor 502 and may cross the field of view of sensor 550. Sensor 550 may be a scanning device for scanning bar codes, QR codes, text, and/or any other well-known scanning or detecting device. Sensors 550 may be positioned at the end of input conveyors 502 such that sensors scan a package immediately before the package is deposited onto multi-path conveyor 506 or may be positioned anywhere else on input conveyor 502.

Figure 6:
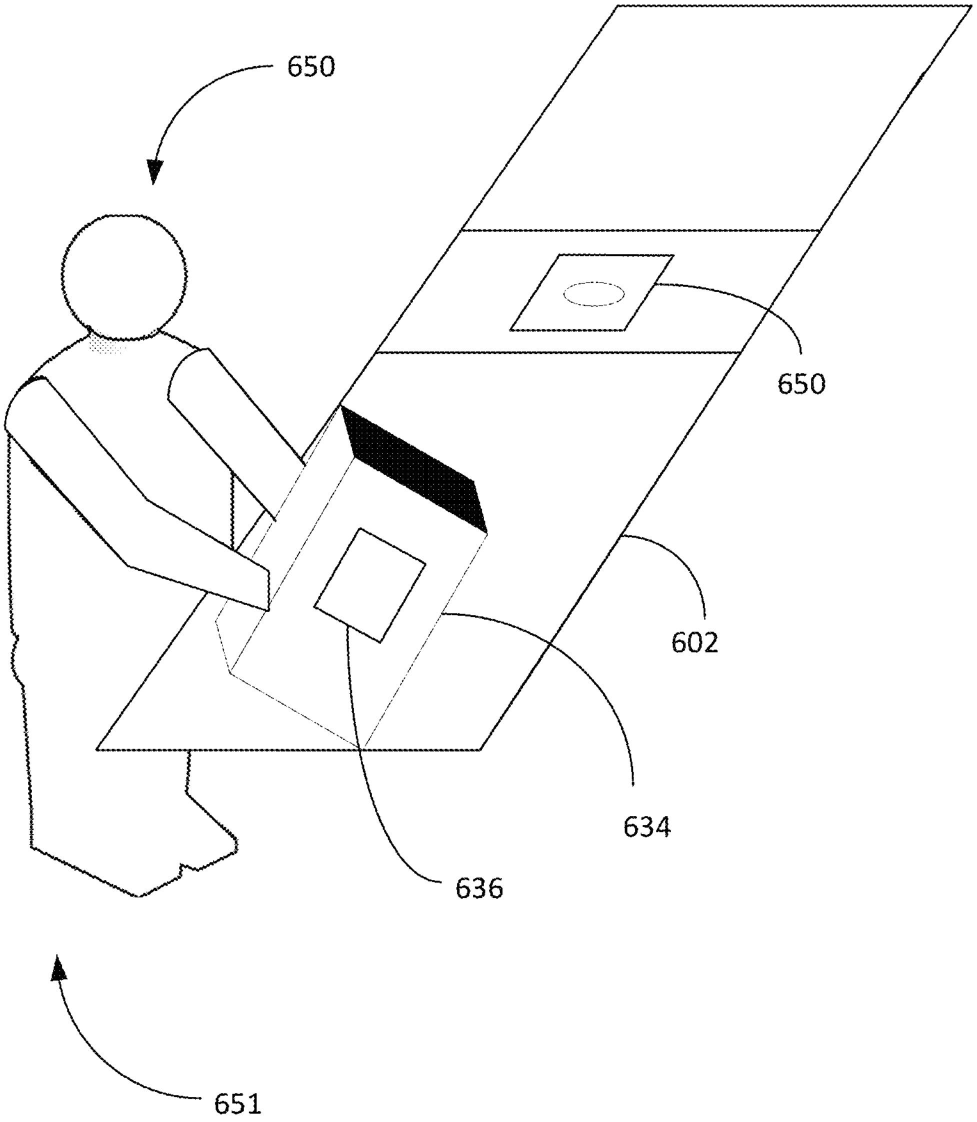
FIG. 6 is a perspective view of an exemplary manual orientation station on an input conveyor, in accordance with one or more exemplary embodiments of the disclosure.

Referring now to FIG. 6, an exemplary input conveyor with a one-sided sensor is illustrated. As one-sided sensors only have one field of view, it may be necessary to reorient a package such that a label or area of a package having package information or representations of package information (e.g., barcode, QR codes, text) is in the field of view of the one-sided sensor. Alternatively, package information may be provided on each side of the package such that reorientation of the package is not necessary.

As shown in FIG. 6, input conveyor 602 may include manual reorientation station 651 wherein one or more individual (e.g., individual 650), which may be tasked with flipping or reorienting a package (e.g., package 634) such that package information (e.g, a label, text, machine readable code) is facing downward so that one-sided sensor 650, which may be the same as one-sided sensor 550 may scan the package information as it comes across its field of view.

Figure 7:
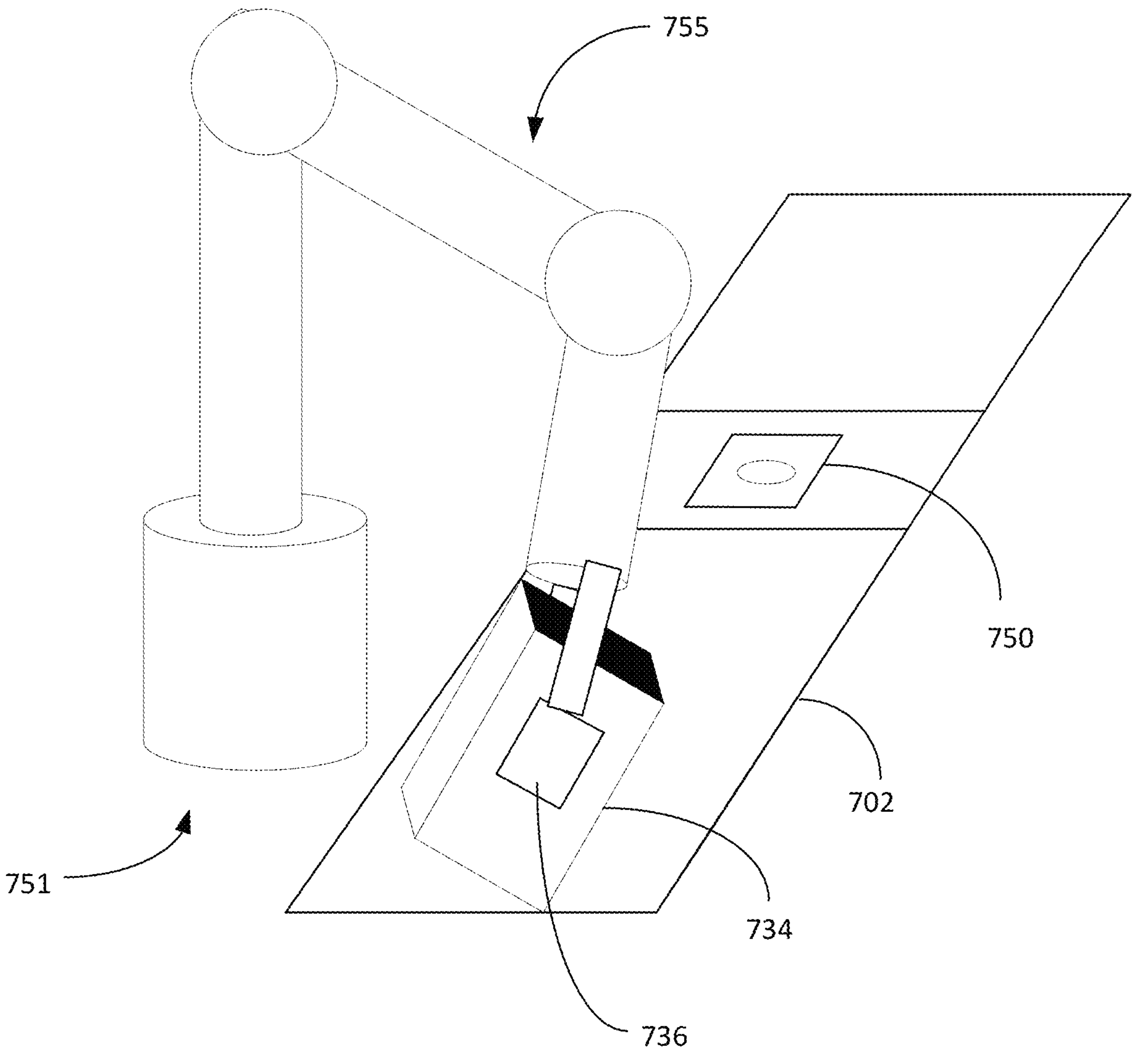
FIG. 7 is an exemplary robotic orientation station on an input conveyor, in accordance with one or more exemplary embodiments of the disclosure.

Alternatively, as shown in FIG. 7, input conveyor 702 may include robotic reorientation station 751 which may include robotic device 655 which may be a multi-directional arm (e.g., with grabbing or flipping ability) tasked with flipping or reorientation of a package (e.g., package 734) such that package information (e.g, a label, text, machine readable code) is facing downward so that one-sided sensor 750, may scan the package information as it comes across its field of view. It is understood that multiple robotic devices may be used.

In yet another example, input conveyor 702 may be designed to include actuators and/or protrusions for reorienting and/or flipping packages. The actuators, slopes, angles, and/or protrusions may be used to selectively reposition or reorient a package such that the package information is in the field of view of the sensor. In another example, the one-sided sensor may be facing a different direction (e.g., downward facing one-sided sensor).

Figure 8:
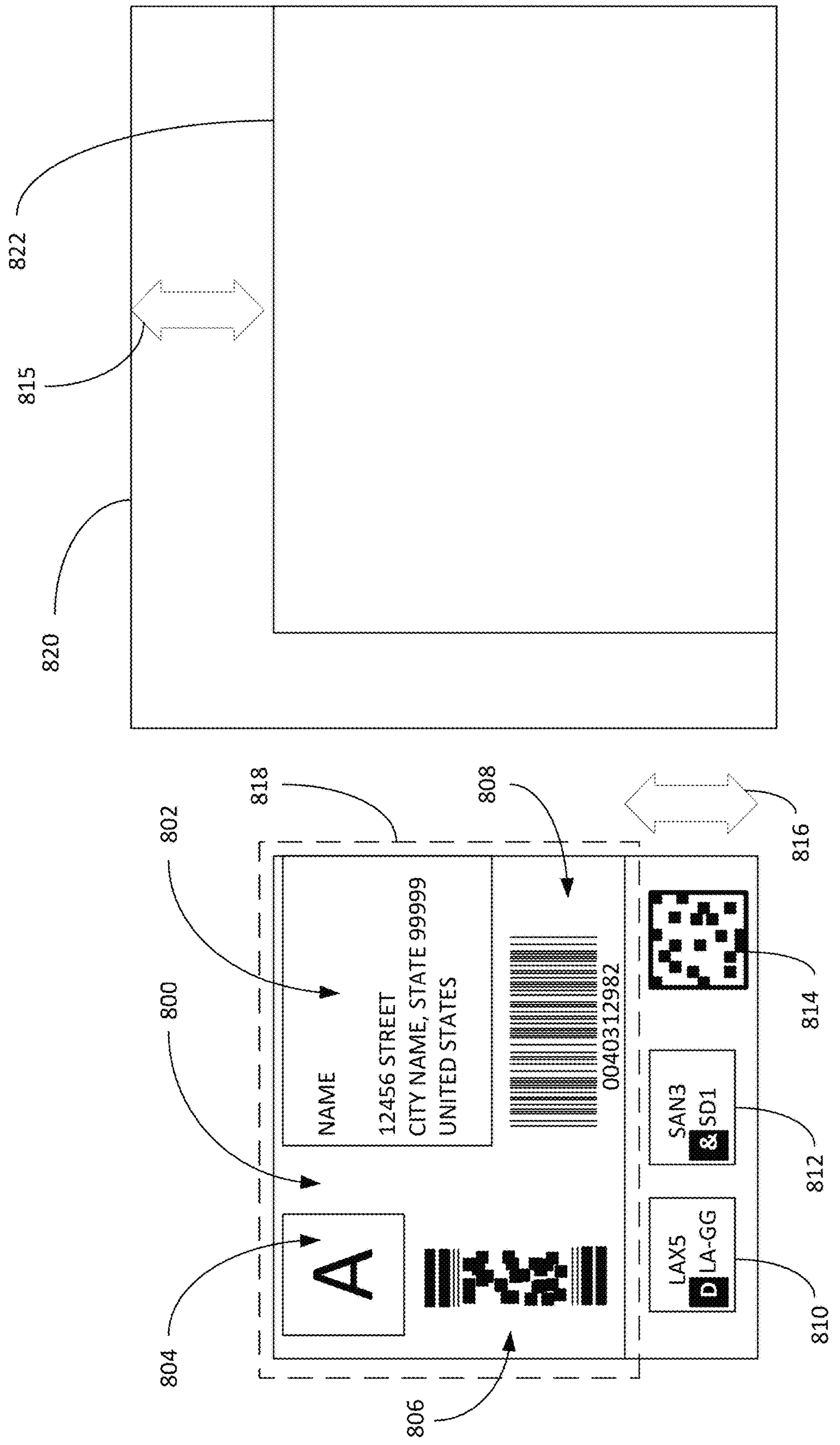
FIG. 8 is an illustration of an exemplary reduced label and corresponding package in accordance with one or more exemplary embodiments of the disclosure.

Referring now to FIG. 8, a sample package label is illustrated. Package label 800 may include shipping information such as shipping name and address 802, shipping identifier 804, shipping identifier 806, and shipping identifier 808. For example, shipping identifier 804 may include an indicator to facilitate shipping (e.g., a letter indicating a shipping center or location) and shipping identifier 806 and 808, which may be different types of machine readable codes (e.g., QR code, bar code, any other machine readable code). Identifiers 806 and/or 808 may be used to identify certain information about the purchase, order, shipping address, shipping route, delivery route, fulfillment center, sortation center, or the like.

Package label 800 may further include information used by a fulfillment or sortation center. For example, identifier 810 and identifier 812 may include text that may be used by individuals at the fulfillment center or sortation center for sorting purposes. In one example, identifier 810 and identifier 812 may include text that identifies the originating facility and identifier 812 may include text that identifies information about the destination. Identifiers 810 and 812 may be used at the sortation or fulfillment facility for manually sorting packages.

Label 800 may further optionally include machine readable code 814, which may be a QR code. In one example, identifier 814 may be indicative of a pre-determined route to a packaging station. As the package sortation system described herein may determine a route for a given package to a packaging station or other downstream location based on shipping information such as the address and/or purchase order or other similar information on label 800, identifiers 810, 812 and 814 may no longer be needed for sortation and routing purposes. Accordingly, the label size may be reduced for the multi-path sorting system.

As shown in FIG. 8, only identifiers in portion 818 may be necessary and package label 800 may be reduced by distance 815. As a result, package 820, previously necessary due to its size sufficient to accommodate indicators 810, 812, 814, may be replaced with smaller package 822, which is sufficient to accommodate portion 818 and the size of the item. Accordingly, less packaging materials may be needed for the multi-path sortation system. It is understood that label 800 may be an adhesive or may be printed onto or otherwise appear on the package.

Figure 9:
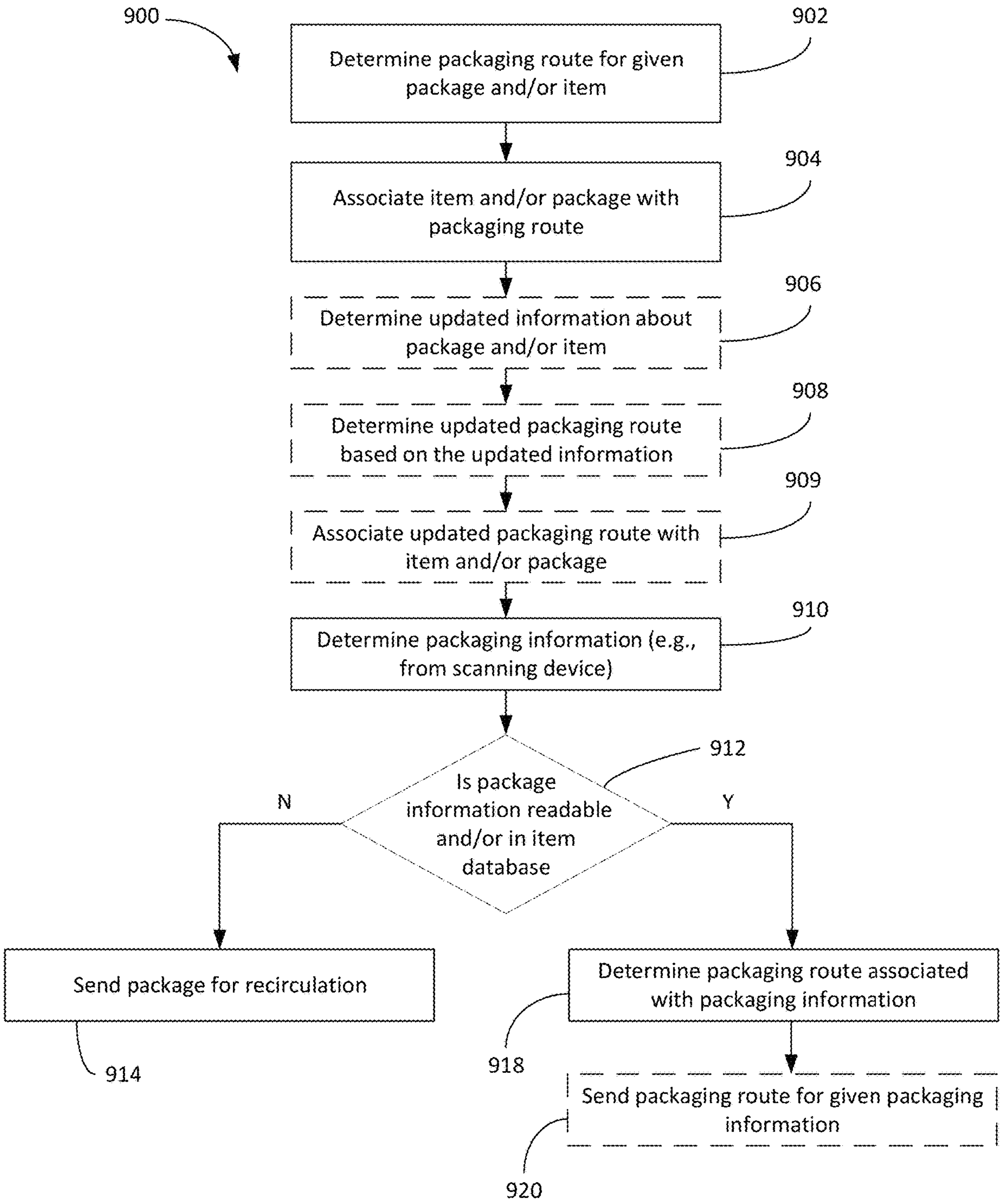
FIG. 9 is an example process flow for a delivery system for determining and updating packaging routes, in accordance with one or more exemplary embodiments of the disclosure.

Referring now to FIG. 9, example process flow 900 of a multi-path sorting system is depicted for sorting and/or routing packages in accordance with one or more exemplary embodiments of the disclosure. To initiate process flow 900 of the multi-path sorting system, at block 902 computer-executable instructions stored on a memory of a device, such as a computing device and/or remote server, may be executed to determine a packaging route for a given item and/or package, which may be a conveying route to a downstream location and/or may include instructions for causing a conveyor to implement the desired route. For example, based on a destination address, a desirable packaging station or downstream sortation station may be identified and conveyors for transporting the package and/or item to the downstream location may be determined.

At block 904, computer-executable instructions stored on a memory of a device, such as a computing device and/or server, may be executed to associate the packaging route determined at block 902 with a package identifier, item identifier, shipping order, user account, or the like (e.g., in a database, catalogue, dataset, or the like). At optional block 906, computer-executable instructions stored on a memory of a device, such as a computing device and/or server, may be executed to determine an update about the item, package, delivery route, delivery vehicle or the like (e.g., a change in shipping address or delivery route).

At optional block 908, computer-executable instructions stored on a memory of a device, such as a computing device and/or server, may be executed to determine an updated packaging route based on the updated information. For example, the desired output conveyor may change based on the updated information. At optional block 909, computer-executable instructions stored on a memory of a device, such as a computing device and/or server, may be executed to associate the updated packaging route determined at block 904 with a package identifier, item identifier, shipping order, user account, or the like (e.g., in a dataset).

At block 910, computer-executable instructions stored on a memory of a device, such as a computing device and/or server, may be executed to determine packaging information. For example, a single-sided or multi-sided scanner may scan information on a package (e.g., on a label or printed onto the package) and this signal and/or data may be shared with the computing device and/or remote server. Alternatively, the determining of the packaging route performed at step 902 may be performed after step 910.

At decision 912, computer-executable instructions stored on a memory of a device, such as a computing device and/or server, may be executed to determine if package information is readable and/or if package information is in a database. For example, at decision 912, it may be determined if the package information is not present and/or is obscured (e.g., smeared) or otherwise not readable. In one example, package information may not be readable because it is not in the field of view (e.g., orientation is improper).

Additionally, or alternatively, it may be determined if a user, address, or other identifier is present in a database where it may be associated with a packaging route. Other information such as the location of the package and/or input conveyor with respect to the multi-path conveyor may also be shared. If the package information is not in the database and/or is not readable, at block 914, computer-executable instructions stored on a memory of a device, such as a computing device and/or server, may be executed to send the package for recirculation upstream (e.g., back to an induction station).

If the package information is readable and is in the database, at block 918 computer-executable instructions stored on a memory of a device, such as a computing device and/or server, may be executed to determine the packaging route associated with the packaging information. For example, the packaging route may include information about the packaging route to the packaging, sortation and/or other downstream station, and/or information about how to manipulate one or more multi-path conveyors to deposit the package on the desired output conveyor.

At optional block 920 computer-executable instructions stored on a memory of a device, such as a computing device and/or server, may be executed to send the packaging route and/or routing instructions based on the packaging route to one or more multi-path conveyors (e.g., a controller of the multi-path conveyors) and/or any other devices in the multi-path sorting system. For example, the computing device and/or server may send routing information, instructions to convey the package based on the routing information, and/or may otherwise cause conveyors to convey the package as desired.

It is understood that the routing information or instructions may cause one or more multi-path conveyors to be manipulated such that the package is deposited on a desired output conveyor. It is further understood that the instructions may include, or a controller of the multi-path conveyor may be programmed with a gap distance value, which may be a distance in one or more axis and/or planes that each package must be distanced from other packages (e.g., 6 inches, 1 foot, 2 feet, etc.).

As the multi-path sorting system may change the packaging route based on updated information, the multi-path sorting system provides flexibility in package routing within the sorting facility that would not be otherwise available for sorting systems using only pre-printed visual indicators (e.g., on a label of the package). In this manner, load balancing of packages in the fulfillment and/or sorting center may be achieved.

Illustrative Device Architecture

Figure 10:
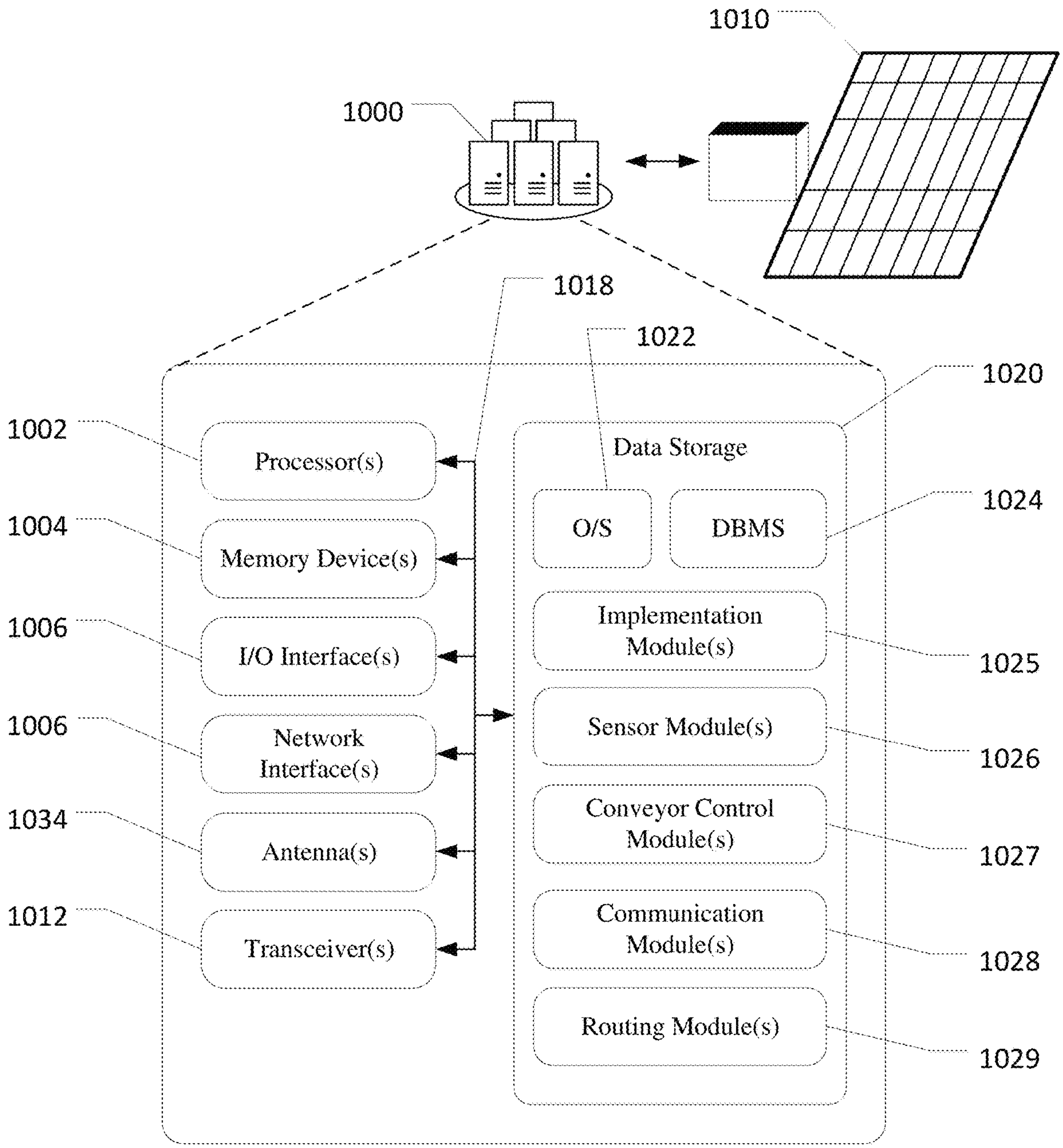
FIG. 10 is a schematic block diagram of a remote server in accordance with one or more exemplary embodiments of the disclosure.

FIG. 10 is a schematic block diagram of an illustrative remote server 1000 of the package sorting system in accordance with one or more exemplary embodiments of the disclosure. The remote server 1000 may be any suitable computing device capable of receiving and/or sending data and/or controlling a conveyor (e.g., input, output, and/or multi-path container), controlling a sensor device (e.g., single-sided and multi-sided), and/or any other component of the multi-path sorting system. Remote server 1000 may optionally be coupled to and/or communicate with devices including, but not limited to, sensors, controllers, computing devices and/or one or more servers, or the like. Remote sensor 1000 may correspond to remote server 106 of FIG. 1, and/or any other servers of FIGS. 1-9. It is understood that remote server 1000 may instead be computing device 1010 and/or the tasks and operations described herein may be performed by both remote server 1000 and computing device 1010. Computing device 1010 may be computing device 110 of FIG. 1.

The remote server 1000 may be configured to communicate via one or more networks with one or more servers, computing devices, conveyors, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The computing device 1000 may further include one or more buses 1018 that functionally couple various components of the computing device 1000. The computing device 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the computing device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more sensor module(s) 1026, one or more conveyor control module(s) 1027, one or more communication module(s) 1028, one or more routing module(s) 1029. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the computing device 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the computing device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining user selected actions and tasks, determining actions associated with user interactions, determining actions associated with user input, sending and receiving signals and/or data to and from one or more sensors, controllers, other computing devices, servers, datastores and the like, initiating commands locally or at remote computing devices, and the like.

Sensor module 1026 may include computer-executable instructions, code, or the like that responsive to execution by one or more of the processor(s) 1002 may perform functions including, but not limited to controlling or overseeing one or more sensors which may be a single-sided sensor or multi-sided sensor. It is understood that sensor module(s) 1026 may control the sensor and/or may oversee and/or process information from one or more sensors.

Conveyor control module 1027 may include computer-executable instructions, code, or the like that responsive to execution by one or more of the processor(s) 1002 may perform functions including, but not limited to controlling one or more conveyors (e.g., input conveyors, output conveyors, and/or multi-path conveyors) or causing manipulation of such conveyors. It is understood that conveyor control module 1027 may control conveyors and/or may oversee and communication with one or more controllers controlling the conveyors.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

The routing module 1029 may include computer-executable instructions, code, or the like that responsive to execution by one or more of the processor(s) 1002 may perform functions including, but not limited to, determining an optimal or desirable routing path to a downstream stations and/or locations (e.g., packaging station, sortation station, etc.). Routing module 1029 may further determine updated routing information based on updated information regarding an order, malfunction, delivery route, or the like, relating to the package, item, order, user account, etc. In one example, routing module 1029 may be responsible for load balancing when slowdowns and/or backups are identified in the fulfillment and/or sortation centers.

Referring now to other illustrative components depicted as being stored in the data storage 1020, the O/S 1022 may be loaded from the data storage 1020 into the memory 1004 and may provide an interface between other application software executing on the computing device 1000 and hardware resources of the computing device 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 1000 is a mobile electronic device, the DBMS 1024 may be any suitable light-weight DBMS optimized for performance on a mobile device.

Referring now to other illustrative components of the computing device 1000, the optional input/output (I/O) interface(s) 1006 may facilitate the receipt of input information by the computing device 1000 from one or more I/O devices as well as the output of information from the computing device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1000 may further include one or more network interface(s) 1008 via which the computing device 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a Bluetooth antenna configured to transmit or receive signals in accordance with established standards and protocols, such as Bluetooth and/or BLE. Alternatively, or in addition to, antenna(e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum (e.g., 900 MHz).

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the computing device 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computing device 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computing device 1000 may include alternate and/or additional hardware, software, or firmware components beyond those described or depicted without departing from the scope of the disclosure. More particularly, it should be appreciated that software, firmware, or hardware components depicted as forming part of the computing device 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method for multi-path sortation of packages, the method comprising:

determining, by a controller, a packaging route based on a destination address corresponding to a first item identifier;

associating a first item identifier with a destination address and the packaging route in a database;

determining a packaging message corresponding to the first item identifier or packaging route;

determining an updated packaging route for the first item identifier based on the packaging message;

associating the updated packaging route with the first item identifier in the database;

causing a first conveyor to convey a first package toward a first scanner device, the first package having a label indicative of the destination address and the first item identifier;

causing the scanner device to scan the label to generate a signal representative of the label;

determining that the signal corresponds to the first item identifier;

determining that the first item identifier corresponds to the updated packaging route associated with the first item identifier in the database;

determining that the packaging route includes use of a second conveyor;

causing the first conveyor to convey the package to a first multi-path conveyor system having a first conveyor portion adjacent to a second conveyor portion, the first conveyor portion and the second conveyor portion configured to move in a first direction;

causing the first multi-path conveyor system to route the package to the second conveyor, the first multi-path conveyor system adapted to move the first conveyor portion independently from the second conveyor portion in the first direction to selectively move a package in a second direction perpendicular to the first direction and adapted to receive packages from the first conveyor and a third conveyor and to selectively deposit the packages onto the second conveyor, a fourth conveyor, and a second multi-path conveyor system; and causing the second conveyor to convey the package to a packaging station for outbound shipment.

2. The method of claim 1, wherein the second multi-path conveyor system is adapted to selectively move a package in the first direction and the second direction and adapted to receive packages from the first multi-path conveyor system and a third multi-path conveyor system and selectively deposit packages onto a fifth, sixth and seventh conveyor.

3. The method of claim 2, wherein the third multi-path conveyor system is adapted to receive packages from an eighth and ninth conveyor and selectively deposit packages onto a tenth and eleventh conveyor and the second multi-path conveyor system, and wherein the tenth and second conveyors convey packages to a first packaging point, the eleventh and fourth conveyors convey packages to a second packaging point, and the seventh conveyor conveys packages to the first conveyor, third conveyor, eighth conveyor, and ninth conveyor.

4. The method of claim 1, further comprising:

causing the third conveyor to convey a second package to a second scanner device, the second package having a second label indicative a second item identifier associated with a second packaging route;

causing the third conveyor to convey the second package to the first multi-path conveyor system;

causing the first multi-path conveyor belt system to route the second package to the fourth conveyor based on the second packaging route;

causing the first multi-path conveyor belt system to position the first package and second package on the first multi-path conveyor system based on a pre-determined gap distance value.

5. A method comprising:

causing, by a controller, a first conveyor to convey a package toward a scanner device, the package having package information on an outer surface of the package;

causing the scanner device to scan the package information;

determining a packaging route for the package based on package information, the packaging route associated with a second conveyor;

causing the first conveyor to convey the package to a first multi-path conveyor system having a first conveyor portion adjacent to a second conveyor portion, the first conveyor portion and the second conveyor portion configured to move in a first direction; and causing the first multi-path conveyor system to route the package to the second conveyor, the first multi-path conveyor system adapted to:

move the first conveyor portion independently from the second conveyor portion in the first direction to selectively move packages in a second direction perpendicular to the first direction; and receive the packages from the first conveyor and a third conveyor, and selectively deposit the packages onto the second conveyor, a fourth conveyor, and a second multi-path conveyor system.

6. The method of claim 5, wherein the second multi-path conveyor system is adapted to:

selectively move the packages in the first direction and the second direction; and receive the packages from the first multi-path conveyor system and a third multi-path conveyor system and selectively deposit packages onto a fifth conveyor, sixth conveyor, and seventh conveyor.

7. The method of claim 6, wherein the third multi-path conveyor system is adapted to receive packages from an eighth conveyor and ninth conveyor and selectively deposit packages onto a tenth conveyor, an eleventh conveyor, and the second multi-path conveyor system, and wherein the tenth conveyor and second conveyor convey packages to a first packaging point, the eleventh conveyor and fourth conveyor convey packages to a second packaging point, and the seventh conveyor conveys packages to the first conveyor, third conveyor, eighth conveyor, and ninth conveyor.

8. The method of claim 5, wherein the scanner device is a six-sided scanner having six scanning sensors arranged such that a first scanning sensor is forward facing, a second scanning sensor is backward facing, a third scanning sensor is left facing, a fourth scanning sensor is right facing, a fifth scanning sensor is upward facing, and a sixth scanning sensor is downward facing.

9. The method of claim 5, wherein the scanner device has an upward facing scanning sensor, and the method further comprises causing a robotic arm to manipulate an orientation of the packaging information such that the packaging information is downward facing with respect to the scanning sensor.

10. The method of claim 5, wherein the package information comprises one or more of an item identifier and a destination address corresponding to the package.

11. The method of claim 5, wherein the package information comprises an item identifier and a destination address corresponding to the package, the method further comprising:

determining the packaging route based on the destination address corresponding to the package;

associating the first item identifier corresponding to the destination address with the packaging route in a database;

determining a packaging message corresponding to the first item identifier or the packaging route;

determining an updated packaging route for the first item identifier based on the packaging message; and associating the updated packaging route with the first item identifier in the database.

12. The method of claim 5, further comprising:

causing the third conveyor to convey a second package to a second scanner device, the second package having second packing information on an outer surface of the second package, the second packaging information including a second item identifier associated with a second packaging route;

causing the third conveyor to convey the second package to the first multi-path conveyor system;

causing the first multi-path conveyor system to route the second package to the fourth conveyor based on the second packaging route; and causing the first multi-path conveyor system to position the first package and second package on the first multi-path conveyor system based on a gap distance value.

13. A system comprising:

memory configured to store computer-executable instructions, and at least one computer processor configured to access memory and execute the computer-executable instructions to:

cause, by a controller, a first conveyor to convey a package toward a scanner device, the package having package information on an outer surface of the package;

cause the scanner device to scan the package information;

determine a packaging route for the package based on package information, the packaging route associated with a second conveyor;

cause the first conveyor to convey the package to a first multi-path conveyor system having a first conveyor portion adjacent to a second conveyor portion, the first conveyor portion and the second conveyor portion configured to move in a first direction; and cause the first multi-path conveyor system to route the package to the second conveyor, the first multi-path conveyor system adapted to:

move the first conveyor portion independently from the second conveyor portion in the first direction to selectively move packages in a second direction perpendicular to the first direction; and receive the packages from the first conveyor and a third conveyor, and selectively deposit the packages onto the second conveyor, a fourth conveyor, and a second multi-path conveyor system.

14. The system of claim 13, wherein the second multi-path conveyor system is configured to:

selectively move the packages in the first direction and the second direction; and receive the packages from the first multi-path conveyor system and a third multi-path conveyor system and selectively deposit packages onto a fifth conveyor, sixth conveyor, and seventh conveyor.

15. The system of claim 14, wherein the third multi-path conveyor system is configured to receive packages from an eighth conveyor and ninth conveyor and selectively deposit packages onto a tenth conveyor, an eleventh conveyor, and the second multi-path conveyor system, and wherein the tenth conveyor and second conveyor are configured to convey packages to a first packaging point, the eleventh conveyor and fourth conveyor are configured to convey packages to a second packaging point, and the seventh conveyor is configured to convey packages to the first conveyor, third conveyor, eighth conveyor, and ninth conveyor.

16. The system of claim 13, wherein the scanner device is a six-sided scanner having six scanning sensors arranged such that a first scanning sensor is forward facing, a second scanning sensor is backward facing, a third scanning sensor is left facing, a fourth scanning sensor is right facing, a fifth scanning sensor is upward facing, and a sixth scanning sensor is downward facing.

17. The system of claim 13, wherein the scanner device has an upward facing scanning sensor, and the method further comprises causing a robotic arm to manipulate an orientation of the packaging information such that the packaging information is downward facing with respect to the scanning sensor.

18. The system of claim 13, wherein the package information comprises one or more of an item identifier and a destination address corresponding to the package.

19. The system of claim 13, wherein the package information comprises an item identifier and a destination address corresponding to the package, and wherein the at least one computer processor is further configured to access memory and execute the computer-executable instructions to:

determine the packaging route based on the destination address corresponding to the package;

associate the first item identifier corresponding to the destination address with the packaging route in a database;

determine a packaging message corresponding to the first item identifier or the packaging route;

determine an updated packaging route for the first item identifier based on the packaging message; and associate the updated packaging route with the first item identifier in the database.

20. The system of claim 13, wherein the at least one computer processor is further configured to access memory and execute the computer-executable instructions to:

cause the third conveyor to convey a second package to a second scanner device, the second package having second packing information on an outer surface of the second package, the second packaging information including a second item identifier associated with a second packaging route;

cause the third conveyor to convey the second package to the first multi-path conveyor system;

cause the first multi-path conveyor system to route the second package to the fourth conveyor based on the second packaging route; and cause the first multi-path conveyor system to position the first package and second package on the first multi-path conveyor based on a gap distance value.

* * * * *